US012114094B2

(12) United States Patent
Liu et al.

(10) Patent No.: US 12,114,094 B2
(45) Date of Patent: Oct. 8, 2024

(54) VIDEO PROCESSING METHOD, APPARATUS, AND DEVICE AND STORAGE MEDIUM

(71) Applicant: TENCENT TECHNOLOGY (SHENZHEN) COMPANY LIMITED, Shenzhen (CN)

(72) Inventors: Man Liu, Shenzhen (CN); Su Cao, Shenzhen (CN); Hongfa Qiu, Shenzhen (CN); Zhe Yan, Shenzhen (CN); Mingsan Wang, Shenzhen (CN); Qinhong Zheng, Shenzhen (CN); Qi Tang, Shenzhen (CN); Ziping He, Shenzhen (CN); Shihai Cheng, Shenzhen (CN); Dong Huang, Shenzhen (CN); Dongxuan Zhang, Shenzhen (CN); Runjia Huang, Shenzhen (CN); Junjie Zhou, Shenzhen (CN); Jingchao Suo, Shenzhen (CN); Jin Jiang, Shenzhen (CN); Yong Li, Shenzhen (CN); Zhenfeng Cai, Shenzhen (CN); Yuewei Chen, Shenzhen (CN); Leteng Weng, Shenzhen (CN); Zhenan Guan, Shenzhen (CN); Yuan Zhao, Shenzhen (CN); Yiheng Liu, Shenzhen (CN); Ying Qi, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 618 days.

(21) Appl. No.: 17/322,893

(22) Filed: May 17, 2021

(65) Prior Publication Data

US 2021/0274106 A1    Sep. 2, 2021

Related U.S. Application Data

(63) Continuation of application No. PCT/CN2019/118775, filed on Nov. 15, 2019.

(30) Foreign Application Priority Data

Dec. 18, 2018 (CN) .......................... 201811554743.8

(51) Int. Cl.
*H04N 5/272* (2006.01)
*G06F 16/74* (2019.01)
(Continued)

(52) U.S. Cl.
CPC .......... *H04N 5/272* (2013.01); *G06F 16/743* (2019.01); *G06F 16/787* (2019.01);
(Continued)

(58) Field of Classification Search
CPC .. H04N 5/272; H04N 5/2621; H04N 21/2743; H04N 21/433; G06F 16/743;
(Continued)

(56) References Cited

U.S. PATENT DOCUMENTS

| 11,218,556 | B2 | 1/2022 | Fu | |
| 2015/0025882 | A1* | 1/2015 | Park | ................... H04M 1/7243 |
| | | | | 715/752 |

(Continued)

FOREIGN PATENT DOCUMENTS

| CN | 103576843 A | 2/2014 |
| CN | 104469143 A | 3/2015 |

(Continued)

OTHER PUBLICATIONS

The World Intellectual Property Organization (WIPO) International Search Report for PCT/CN2019/118775 Jan. 23, 2020 6 Pages (including translation).

(Continued)

*Primary Examiner* — Nhan T Tran

US 12,114,094 B2

Page 2

(74) *Attorney, Agent, or Firm* — ANOVA LAW GROUP, PLLC

(57) ABSTRACT

A video processing method, apparatus, and device and a storage medium are provided. The method includes: monitoring an operation indication inputted by a user through a personal homepage on a social platform, the personal homepage being used for displaying personal information of the user; obtaining, when the operation indication is a shooting indication for shooting a personal status video, the personal status video; uploading the personal status video to a back-end server of the social platform; and displaying indication information of the personal status video in a personal-information display region of the personal homepage.

20 Claims, 13 Drawing Sheets

(51) Int. Cl.
  *G06F 16/787* (2019.01)
  *G11B 27/036* (2006.01)
  *G11B 27/34* (2006.01)
  *G11B 27/36* (2006.01)
  *H04N 5/262* (2006.01)

(52) U.S. Cl.
  CPC ............ *G11B 27/036* (2013.01); *G11B 27/34* (2013.01); *G11B 27/36* (2013.01); *H04N 5/2621* (2013.01)

(58) Field of Classification Search
  CPC ..... G06F 16/787; G11B 27/036; G11B 27/34; G11B 27/36; G11B 27/031; H04L 51/10; H04L 51/52
  See application file for complete search history.

(56) References Cited

U.S. PATENT DOCUMENTS

| 2015/0139615 | A1* | 5/2015 | Hill | H04N 21/2743 |
| | | | | 386/285 |
| 2017/0272525 | A1 | 9/2017 | Bhagwan et al. | |
| 2019/0230467 | A1* | 7/2019 | Williams | H04L 67/306 |
| 2019/0320032 | A1* | 10/2019 | Fu | H04L 67/535 |
| 2020/0259771 | A1* | 8/2020 | Song | G06Q 30/02 |
| 2020/0413162 | A1 | 12/2020 | Hao | |

FOREIGN PATENT DOCUMENTS

| CN | 104735544 | A | | 6/2015 | |
| CN | 105262959 | A | | 1/2016 | |
| CN | 105827513 | A | * | 8/2016 | ............ H04L 51/04 |
| CN | 107038034 | A | | 8/2017 | |
| CN | 107038201 | A | | 8/2017 | |
| CN | 108647343 | A | | 10/2018 | |
| CN | 108900791 | A | | 11/2018 | |
| CN | 108920693 | A | | 11/2018 | |
| CN | 108984707 | A | | 12/2018 | |
| KR | 20150009186 | A | | 1/2015 | |
| WO | 2012011646 | A1 | | 1/2012 | |
| WO | 2018121320 | A1 | | 7/2018 | |

OTHER PUBLICATIONS

The State Intellectual Property Office of the People's Republic of China (SIPO) Office Action 1 for for 201811554743.8 Mar. 18, 2021 13 Pages (including translation).
China National Intellectual Property Administration (CNIPA) Office Action 3 for 201811554743.8 Jun. 16, 2022 14 pages (including translation).
Jumping Rabbit, "Why is my QQ space setting status not notifying friends, but some friends can still see it?," Baidu knows, May 12, 2010 (May 12, 2010), Retrieved from the Internet: URL: https://zhidao.baidu.com/question/152596935.html [Retrieved on Jun. 20, 2022]. 4 pages.
The Japan Patent Office (JPO) Notification of Reasons for Refusal for Application No. 2021-509757 and Translation Apr. 19, 2022 16 Pages (including translation).
Anonymous, "LINE Instruction manual for adults," Takarajimasha Co., Ltd., 2018 latest version, Mar. 20, 2018, p. 118-122. 8 pages.
Anonymous, "A book that solves all the "I don't know!" on LINE/Facebook/Twitter/Instagram," Yosensha Co., Ltd., First Edition, Apr. 12, 2018, p. 153-154, 190-191. 7 pages.
Korean Intellectual Property Office (KIPO) Office Action 1 for 10-2021-7010164 Jul. 26, 2022 9 Pages (including translation).
Hyeong-Min In, "Dontok, the first mobile messenger to support video profiles," News tap, Jun. 13, 2014. 2 pages.
Yoo-Sung Kim, "Instagram unveils 24-hour automatic deletion function," Edaily, Aug. 3, 2016. 3 pages.
Indian Patent Office Examination report for Application No. 202147022430 Feb. 28, 2022 6 pages.

* cited by examiner

VIDEO PROCESSING METHOD, APPARATUS, AND DEVICE AND STORAGE MEDIUM

CROSS-REFERENCES TO RELATED APPLICATIONS

This application is a continuation application of PCT Patent Application No. PCT/CN2019/118775, filed on Nov. 15, 2019, which claims priority to Chinese Patent Application No. 201811554743.8, entitled "VIDEO PROCESSING METHOD, APPARATUS, AND DEVICE AND STORAGE MEDIUM" filed with the National Intellectual Property Administration, PRC on Dec. 18, 2018, both of which are incorporated by reference in their entirety.

FIELD OF THE TECHNOLOGY

The present disclosure relates to the field of computer technologies, and in particular, to a video processing method, apparatus, and device and a storage medium.

BACKGROUND OF THE DISCLOSURE

Currently, in daily life, a user usually tends to publish an update of life on a social platform such as Moments of WeChat and Qzone. In this way, other users on the social platform, for example, social contacts on the social platform added by the publisher, as browsers, can view the update, such as, text, a picture, or a video, published by the publisher.

SUMMARY

Embodiments of the present disclosure provide a video processing method, apparatus, and device and a storage medium, to resolve the problem of interference with friends caused by publishing updates on a social platform.

An embodiment of the present disclosure provides a video processing method, performed by a computer device, the method including: monitoring an operation indication inputted by a user through a personal homepage on a social platform, the personal homepage being used for displaying personal information of the user; obtaining, when the operation indication is a shooting indication for shooting a personal status video, the personal status video: uploading the personal status video to a back-end server of the social platform: and displaying indication information of the personal status video in a personal-information display region of the personal homepage.

An embodiment of the present disclosure provides a computer device, including: at least one processor: and a memory communicatively connected to the at least one processor, the memory storing instructions executable by the at least one processor, the instructions being executed by the at least one processor, to cause the at least one processor to perform a plurality of operations. The operations include monitoring an operation indication inputted by a user through a personal homepage on a social platform, the personal homepage being used for displaying personal information of the user: obtaining, when the operation indication is a shooting indication for shooting a personal status video, the personal status video: uploading the personal status video to a back-end server of the social platform: and displaying indication information of the personal status video in a personal-information display region of the personal homepage.

An embodiment of the present disclosure provides a non-transitory computer storage medium including computer instructions, the computer instructions, when run on a computer device, causing the computer device to perform a plurality of operations. The operations include monitoring an operation indication inputted by a user through a personal homepage on a social platform, the personal homepage being used for displaying personal information of the user; obtaining, when the operation indication is a shooting indication for shooting a personal status video, the personal status video: uploading the personal status video to a back-end server of the social platform: and displaying indication information of the personal status video in a personal-information display region of the personal homepage.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following descriptions show merely exemplar embodiments of the present disclosure, and a person of ordinary skill in the art may still derive other drawings from these accompanying drawings without creative efforts.

DESCRIPTION OF EMBODIMENTS

Figure 1:
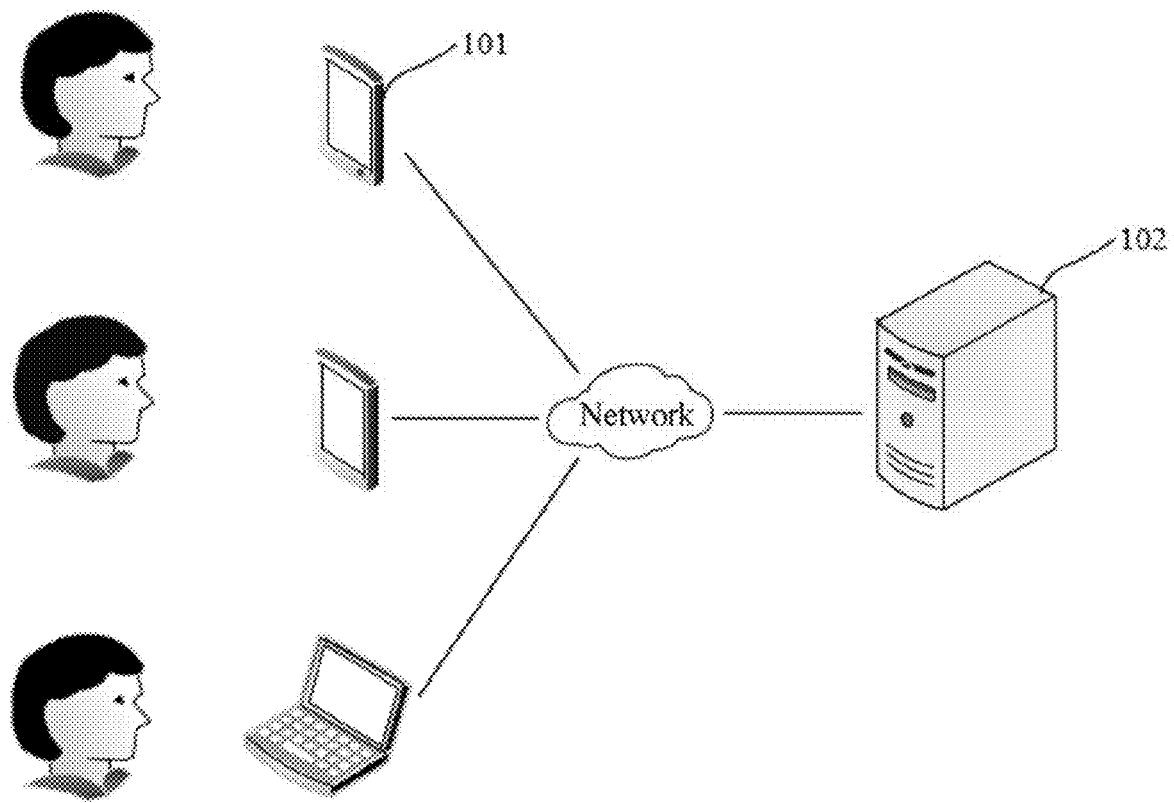
FIG. 1 is a schematic diagram of an application scenario according to an embodiment of the present disclosure.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure. The embodiments in the present disclosure and features in the embodiments may be combined with each other in the case of no conflict. In addition, although a logic order is shown in the flowcharts, in some cases, the shown or described steps may be performed in an order different from the order herein. To help understand the technical solutions provided in the embodiments of the present disclosure, some key items used in the embodiments of the present disclosure are explained herein first.

Centralized push portal: For existing social platforms, such as Moments in a current WeChat application, a centralized push portal is usually used. Usually, in the WeChat application, a portal to Moments is provided. The portal is a centralized push portal. In addition, after a corresponding page is accessed through the centralized push portal, usually updates of a plurality of social contacts are presented on the page. Moments is also used as an example. Currently, after Moments is accessed, updates of a plurality of friends can be browsed on a page of Moments, which is a prominent feature of a social platform based on centralized pushing.

Personal homepage: The difference between the personal homepage and a page based on the centralized push portal lies in that the personal homepage is only used for presenting personal information of one user. For example, a personal homepage of a user A only includes content related to the user A, for example, an avatar, a nickname, a personal profile, or the like of the user A, a personal status video published by the user A, or the like.

Personal status video: a video published on a personal homepage. A user can record life, present personal life and moods by shooting a personal status video at will.

social contact: a user on the same social platform. A social contact of a user is a user, other than the user, that may interact with the user, and generally speaking, may be a friend added by the user on the social platform.

Publisher: a user publishing a personal status video.

Viewer: a user browsing a personal status video. On a social platform, a user may be both a publisher and a viewer. As a publisher, the user may publish a personal status video, an as a viewer, the user may browse a personal status video published by a social contact.

In addition, the term "and/or" in this specification describes only an association relationship for describing associated objects and represents that three relationships may exist. For example, A and/or B may represent the following three cases: Only A exists, both A and B exist, and only B exists. In addition, if there is no special description, the character "/" in this specification usually indicates an "or" relationship between the associated objects.

Most of the present social platforms use a centralized push portal. For example, Moments corresponds to a Moments portal and Qzone corresponds to a Qzone portal. After corresponding portals are selected, corresponding pages can be accessed. Updates published by other users can be browsed in the pages. With the gradual expansion of the social circle, social contacts added on a social platform are from various circles, for example, may include company colleagues, company leaders, relatives, friends, and the like. Due to complex social relationships, a user may consider various social relationships when publishing relatively personal content and updates on the social platform, and cannot record life without pressure. Besides, once the user continually publishes a plurality of updates, pages of social contacts of the user on the social platform are likely to be spammed by the content published by the user. Consequently, the social contacts are interfered with.

Because of existence of the centralized push portal, a user and social contacts of the user on a social platform are displayed on the same page, and once the user publishes an update, the update is displayed on the page and provided for a plurality of social contacts to browse. Consequently, in consideration of social relationships, a user has to consider a lot when publishing videos and as a result, cannot publish updates at will. In view of this, to resolve the foregoing problem, the current fixed social mode of the social platform needs to be changed, that is, the existing centralized push portal needs to be changed. Therefore, content published by a publisher is no longer pushed to all social contacts in such a centralized push manner, thereby reducing the psychological pressure of the publisher when the publisher publishes new content.

In view of the foregoing analysis and consideration, the embodiments of the present disclosure provide a video processing method. In the method, when a shooting indication for shooting a personal status video is detected, the personal status video is obtained and uploaded to a back-end server, and indication information of the personal status video is displayed on a personal homepage. In this way, the personal status video published by the user is published on the personal homepage. The personal homepage is different from the current centralized push portal of the social platform, and only a personal status video is displayed in the personal homepage, so that the user can relaxedly publish a personal status video on the personal homepage of the user without interfering with social contacts. Correspondingly, if another person A wants to browse the personal status video of the publisher, the person A needs to browse the personal status video in the personal homepage of the publisher. That is, the status video of the publisher is not shown on the centralized push portal page of the person A. Therefore, it is unnecessary for the publisher to overly consider social relationships and concern interference with others. Therefore, the pressure of video publishing is reduced, thereby providing better social experience for the user.

In the embodiments of the present disclosure, before the personal status video is published, the publisher can further edit the shot personal status video, for example, add text, a sticker adding, music, or the like, to assist the publisher in directly expressing moods in which the publisher shoots the video, and further increase fun for the personal status video.

Besides, after the publisher publishes the personal status video, to inform social contacts of the publisher that the publisher publishes the personal status video, a video mark may be displayed in a personal-information display region of the publisher. In this way, others may learn that the publisher publishes the personal status video. A social contact who wants to browse the personal status video of the publisher may actively access the personal homepage of the publisher for browsing or browse the video in a shortcut manner.

In the embodiments of the present disclosure, duration during which the personal status video is provided for the social contacts to browse may further be limited. When preset duration is reached, the personal status video of the publisher is hidden from the social contacts, so that the social contacts cannot browse the personal status video of the publisher any longer. In this way, because the video is hidden from the social contacts after the preset duration, the publisher can share life and moods through the personal status video when shooting the video without worry about that a published video expressing a relatively hysterical mood may exert a bad impression on a subsequently added social contact, thereby further reducing the psychological pressure of the publisher and improving the privacy of information publishing.

After a design idea of the embodiments of the present disclosure is described, the following briefly describes application scenarios to which the technical solutions in the embodiments of the present disclosure can be applied. The application scenarios described below are merely used for describing rather than limiting the embodiments of the present disclosure. During specific implementation, the technical solutions provided in the embodiments of the present disclosure may be flexibly applied according to an actual requirement.

FIG. 1 shows an application scenario to which technical solutions in the embodiments of the present disclosure are applicable. In the scenario, user equipment 101 and a back-end server 102 may be included.

The user equipment 101 may be a device such as a tablet computer (pad), a mobile phone, a notebook computer, or a personal computer (PC). An application (APP) corresponding to a social platform is installed on the user equipment 101, or a web page of a social platform can be opened through a browser on the user equipment 101. The social platform may be any social platform.

The back-end server 102 may be a back-end server of the foregoing social platform. Operations performed by a user on the APP or web page of the social platform are all transmitted to the back-end server 102. The back-end server 102 provides a corresponding response to the user after the processing. For example, after the user shoots a personal status video and chooses to publish the personal status video, the personal status video is transmitted to the back-end server 102, the back-end server 102 returns a response indicating that the publishing succeeds, and corresponding prompt information is displayed on the user equipment 101 of the user. Besides, interaction between users also needs to be processed and forwarded through the back-end server 102.

Certainly, the method provided in the embodiments of the present disclosure is not limited to the application scenario shown in FIG. 1, and may also be applied to another possible application scenario, which is not limited in this embodiment of the present disclosure. Functions that can be implemented by devices in the application scenario shown in FIG. 1 are described in the following method embodiments together. Details are not described herein.

To further describe the technical solution provided in the embodiments of the present disclosure, the technical solution is described in detail below with reference to the accompanying drawings and specific embodiments. Although the embodiments of the present disclosure provide method operational steps shown in the following embodiments or accompany drawings, it is understood that more or fewer operational steps may be included in the methods. In the steps in which no necessary causal relationship logically exists, the execution order of the steps is not limited to the execution orders provided in the embodiments of the present disclosure. During an actual processing procedure of the method or when the method is executed by an apparatus, sequential execution or parallel execution may be performed according to the method shown in the embodiment or the accompanying drawing.

Figure 2:
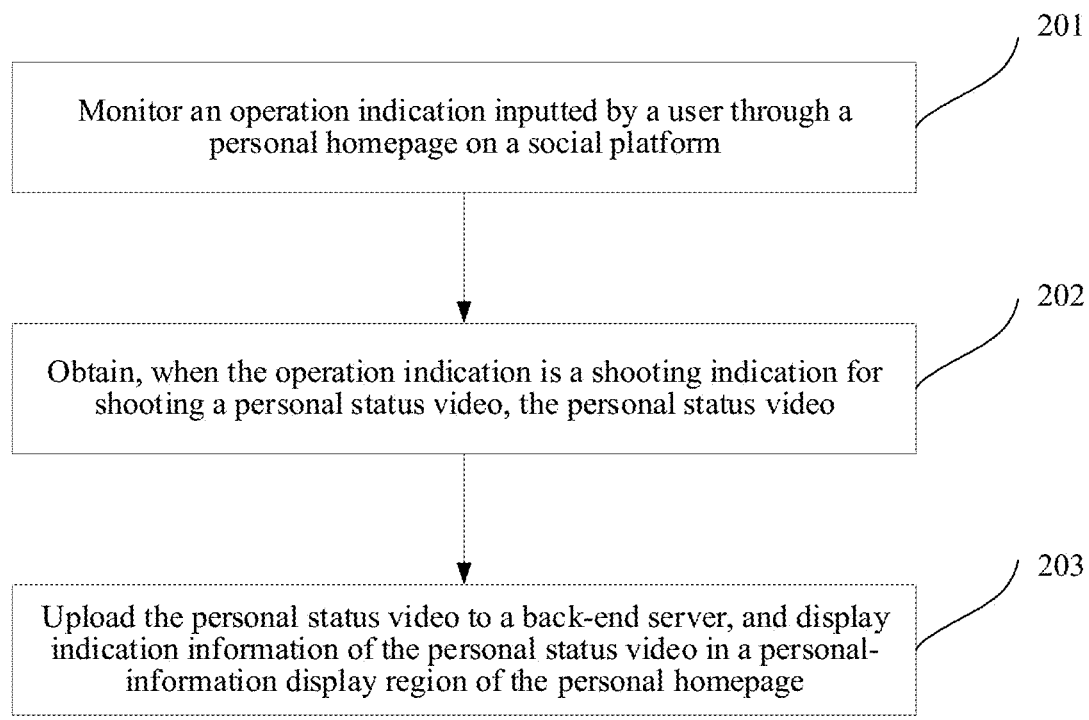
FIG. 2 is a flowchart of a video processing method according to an embodiment of the present disclosure.

FIG. 2 is a flowchart of a video processing method according to an embodiment of the present disclosure. For example, the method is applicable to the scenario shown in FIG. 1 and is performed by a computer device. A procedure of the method is described as follows.

Step 201: Monitor an operation indication inputted by a user through a personal homepage on a social platform.

Figure 3:
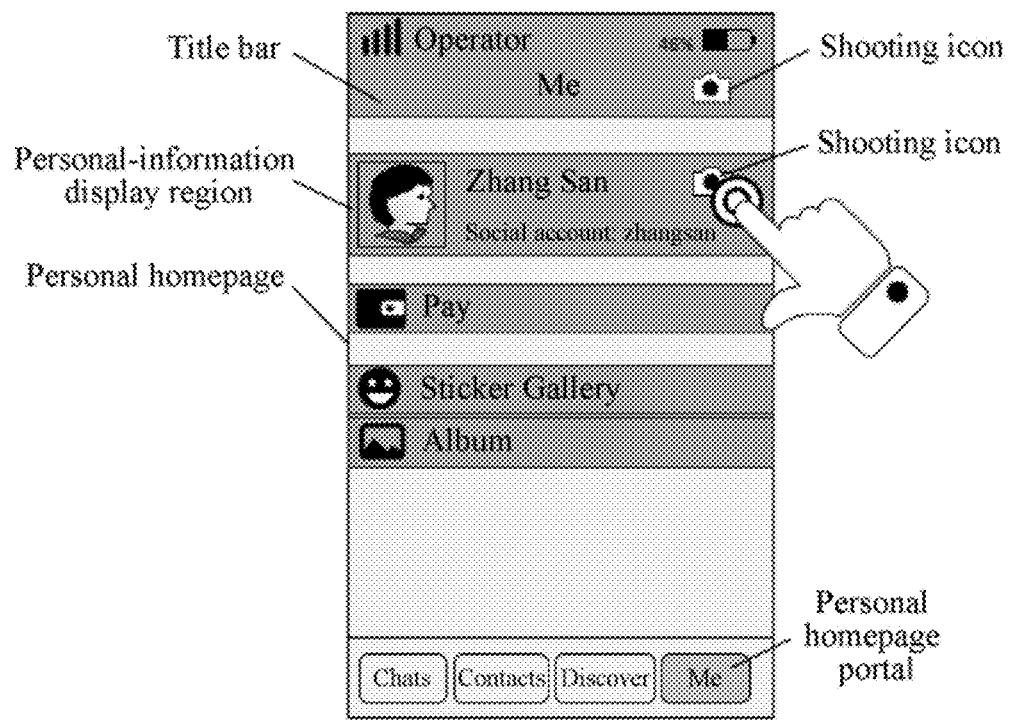
FIG. 3 is a schematic diagram of a personal homepage of a social platform user according to an embodiment of the present disclosure.

In the embodiments of the present disclosure, FIG. 3 is a schematic diagram of display of a personal homepage of a social platform user (hereinafter referred to as user) of a social platform. An APP of the social platform shown in FIG. 3 is used as an example for illustration. Generally, in the APP of the social platform, a portal linked to a personal homepage is provided. For example, "Me" on the lower right corner of FIG. 3 is a portal into a personal homepage. After an operation is performed on the button "Me", the personal homepage can be accessed, and a display screen of a personal homepage of which a username is "Zhang San" shown in FIG. 3 is presented. When user equipment used by the user is a touch device, the button "Me" can be tapped for access to the personal homepage. When the user equipment used by the user is a non-touch device, the button "Me" may be selected by using direction keys and selection of "Me" may be confirmed by using a confirm key, to access the personal homepage.

Specifically, the personal homepage generally includes a plurality of information display regions such as a personal-information display region and a specific functional portal. The personal-information display region is used for displaying personal information of a user to whom the current personal homepage belongs. The personal-information display region may be used for displaying the personal information, such as an avatar icon, a nickname, a personal signature, and a social account, of the user, and may certainly display other possible information related with the user, which is not limited in this embodiment of the present disclosure. If the specific functional portals are portals linked to specific functional pages, such as "Pay", "Sticker Gallery", and "Album" shown in FIG. 3, the specific functional portals can be respectively linked to a wallet page, a sticker management page, and an album page.

Specifically, the personal-information display region, as shown in FIG. 3, is a region including personal information such as an avatar icon, a nickname, a personal signature, and a social account, may alternatively be a region including personal information, such as an avatar icon, a nickname, a personal signature, and a social account, and a title bar of a personal homepage, or certainly may be a region including other pieces of content or a user-customizing region. The title bar may include a status bar of the user equipment or may not include a status bar. The status bar is used for displaying information about the user equipment such as a battery level, a network signal, and an operator of an accessed network.

Certainly, FIG. 3 is a schematic diagram of a personal homepage of a user opened by the user in an APP of a social platform. When the user opens a personal homepage of a social contact on the social platform, display content may be different. Specifically, content that needs to be displayed on a personal homepage can be set according to actual requirements, which is not limited in this embodiment of the present disclosure.

In one embodiment of the present disclosure, the user may perform corresponding operations on the personal homepage to enable different functions or access different functional pages. After the user performs an operation on the personal homepage, the user equipment can receive an operation indication corresponding to the operation of the user.

For example, for a touch device, the user equipment can detect whether the user performs a touch operation on a touch panel of the device. When the user equipment receives the touch operation of the user, the device may respond correspondingly according to a position of the touch operation of the user. For example, after the user performs an operation on the personal homepage of the social platform, the user equipment can detect the operation indication through the personal homepage of the social platform.

Step 202: Obtain, when the operation indication is a shooting indication for shooting a personal status video, the personal status video.

In one embodiment of the present disclosure, when the user wants to publish the personal status video, the user can operate a shooting icon on the personal homepage after accessing the personal homepage of the user. The user equipment can receive an operation indication corresponding to the operation of the user. The operation indication is used for indicating personal status video shooting, to further obtain a personal status video that the user wants to publish.

As shown in FIG. 3, the shooting icon may be displayed in the personal-information display region of the personal homepage, or the shooting icon may be displayed in the title bar of the personal homepage. Certainly, the shooting icon may alternatively be displayed in another possible region of the personal homepage, which is not limited in this embodiment of the present disclosure.

Specifically, when the user wants to publish a new personal status video, if the user equipment is a touch device, the user can directly tap the shooting icon, as shown in FIG. 3. The user equipment can receive an operation indication of the user, determine that the operation indication is a shooting indication, call a video acquisition control for personal status video shooting, and obtain the personal status video collected by the video acquisition control.

In an actual application, the user may want to shoot a new video as a to-be-published personal status video, may use an already-taken video as a to-be-published personal status video, may use a self-made video as a to-be-published personal status video, or may select a video from the Internet as a to-be-published personal status video. Therefore, to meet a plurality of types of user requirements, a plurality of video-collecting manners can be provided for the user, and different video-collecting manners correspond to different video acquisition controls.

Figure 4:
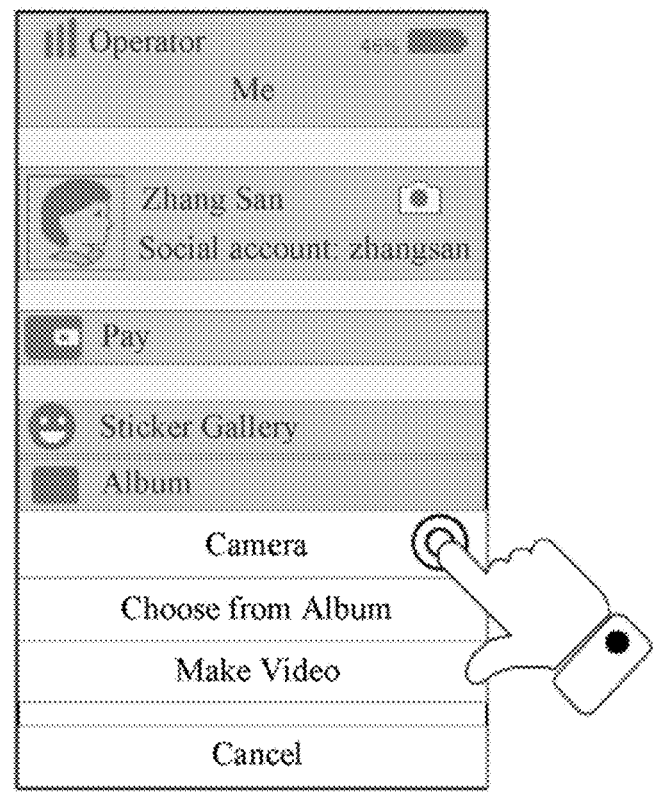
FIG. 4 is a schematic diagram of a video-collecting-manner selection interface according to an embodiment of the present disclosure.

Specifically, after the shooting indication of the user is received, a video-collecting-manner selection interface as shown in FIG. 4 may be displayed. The user performs an operation on the video-collecting-manner selection interface. Correspondingly, the user equipment can receive a video-collecting-manner determining indication inputted by the user through the video-collecting-manner selection interface, and call a video acquisition control corresponding to the video-collecting-manner determining indication to collect the personal status video. As shown in FIG. 4, the video-collecting-manner selection interface includes a "Camera" option, a "Choose from Album" option, and a "Make Video" option. Certainly, the video-collecting-manner selection interface shown in FIG. 4 is merely a possible display interface. During specific implementation, content on the interface may be further set properly according to specific requirements, which is not limited in this embodiment of the present disclosure.

The "Camera" option corresponds to an option of shooting a new video as a to-be-published personal status video. When the user selects the option, which is an example specifically used in FIG. 4, a corresponding video shooting control is called to shoot the personal status video.

The "Choose from Album" option corresponds to an option of selecting an already-taken video from a local album as a to-be-published personal status video. When the user selects the option, a local video uploading control is called for the user to display a video selection interface, and videos that have been stored locally are displayed on the video selection interface. After the user makes a selection, a video selected by the user may be used as the to-be-published personal status video.

The "Make Video" option corresponds to an option of using a user-made video as a to-be-published personal status video. For example, the user may select pictures in a local album for editing a new video and use the new video as the to-be-published personal status video. When the user selects the option, a control for uploading pictures in a local album to edit a personal status video may be called for video making.

Certainly, the video-collecting-manner selection interface may further include a video collecting manner corresponding to a control for obtaining a published video from a social platform, and another possible video collecting manner, which is not limited in this embodiment of the present disclosure.

In one embodiment of the present disclosure, to encourage a user to shoot and publish at will, different video durations may be set for different video collecting manners. For example, when the user collects the personal status video in a "Camera" manner, a personal status video of which duration is 15 s can be shot and obtained, and when the personal status video is collected in another manner, only a personal status video of which duration is 10 s can be obtained.

In one embodiment of the present disclosure, after the personal status video is obtained in any of the foregoing collecting manners, the obtained personal status video may be further edited to enrich the content of the personal status video.

Figure 5:
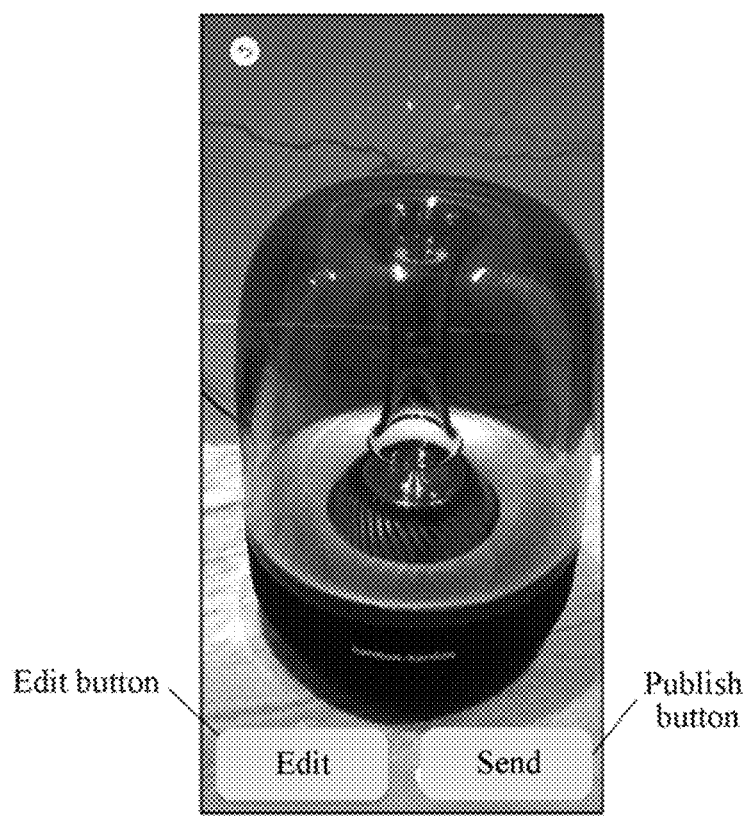
FIG. 5 is a schematic diagram of an interface after a personal status video is obtained according to an embodiment of the present disclosure.

Specifically, using an example in which the personal status video is obtained in a manner of shooting a new video, when obtaining a personal status video through shooting, the user may automatically access a personal-status-video editing interface to edit the video by calling a video editing control, or a display interface shown in FIG. 5 may be displayed. The display interface may include an edit button and a publish button. When the user selects the publish button, the personal status video can be directly published. When the user selects the edit button, the personal-status-video editing interface is displayed for the user.

Figure 6:
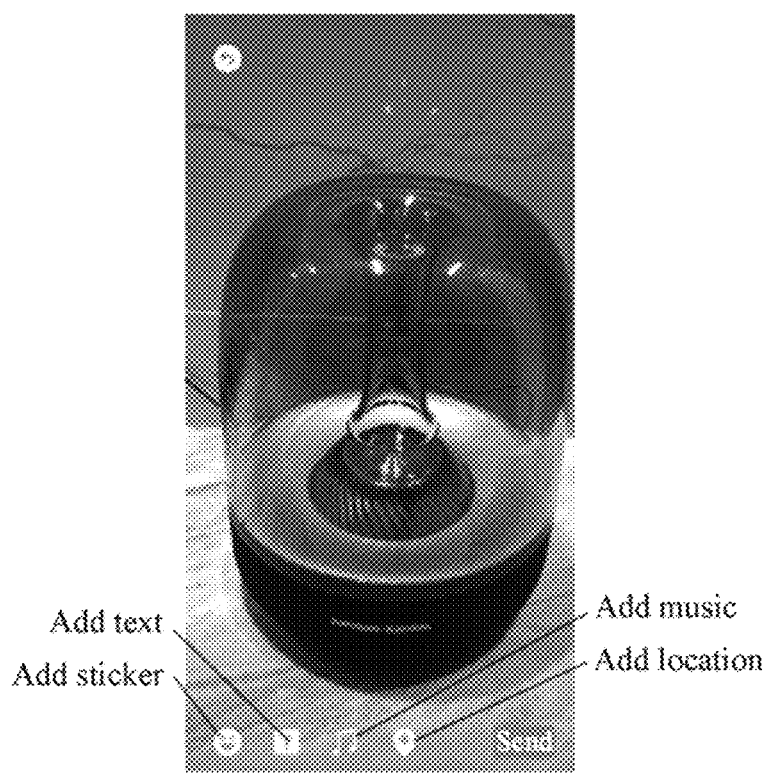
FIG. 6 is a schematic diagram of a personal-status-video editing interface according to an embodiment of the present disclosure.

FIG. 6 is a schematic diagram of display of a possible personal-status-video editing interface. The user may select an editing operation to be performed on the personal status video in the personal-status-video editing interface, and further edit the personal status video correspondingly by calling the video editing control. The personal-status-video editing interface shown in FIG. 6 includes an icon corresponding to adding a sticker to a personal status video, an icon corresponding to adding text to a personal status video, an icon corresponding to adding music to a personal status video, and an icon corresponding to adding geographical location information to a personal status video.

Figure 7:
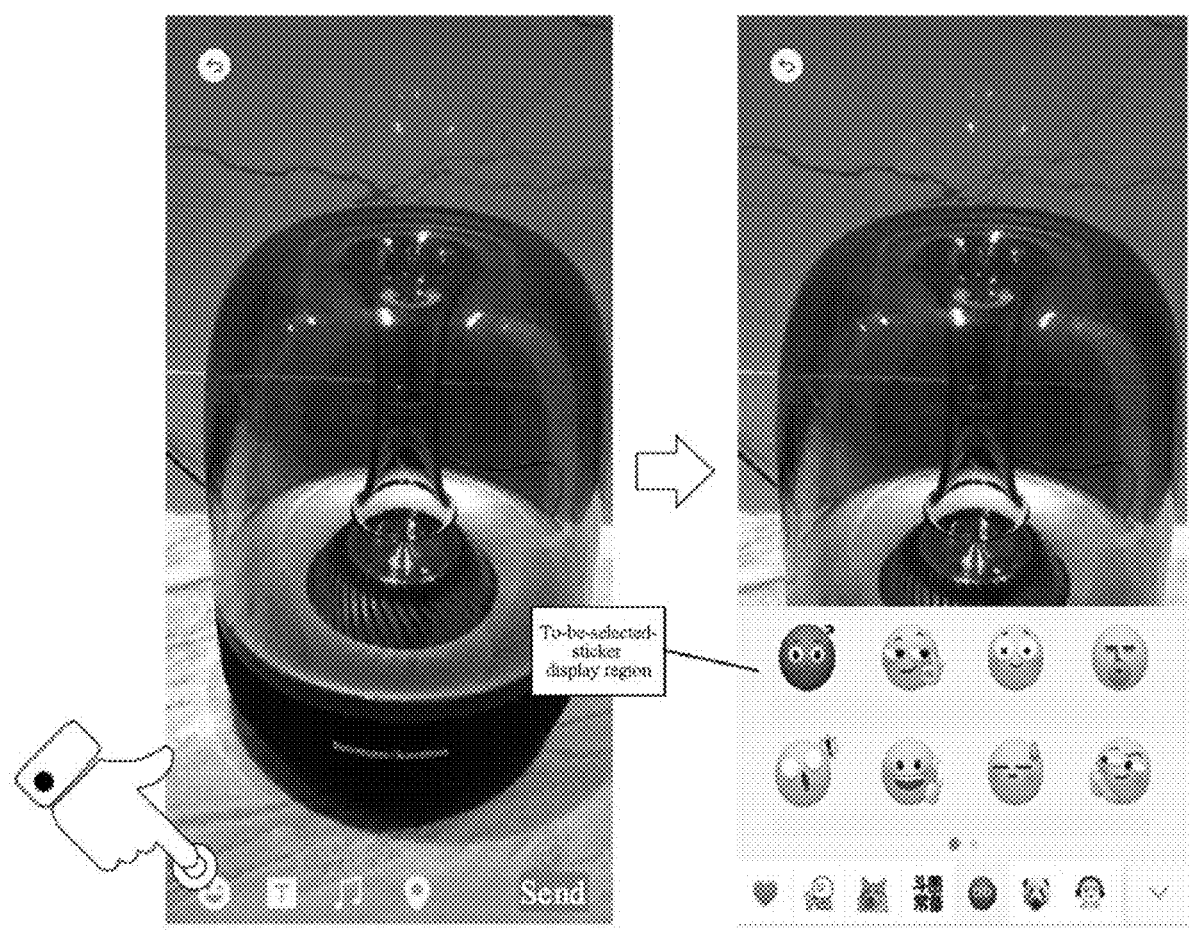
FIG. 7 is a schematic diagram of a sticker adding interface according to an embodiment of the present disclosure.

In an embodiment of the present disclosure, as shown in FIG. 7, after the user operates the icon of adding a sticker to a personal status video, a display screen including a to-be-selected-sticker display region is displayed. Some of stickers that the user can select are displayed in the to-be-selected-sticker display region. The user may select a desired sticker and add the sticker to the personal status video. After the user selects the sticker, the user can further drag the sticker, to adjust the sticker to a desired position, and can scale the sticker to a desired size.

In one embodiment of the present disclosure, the sticker may be a still sticker or a dynamic sticker. Generally, the sticker is displayed in a form of a picture. Therefore, the sticker may be a still picture or a dynamic picture.

Figure 8:
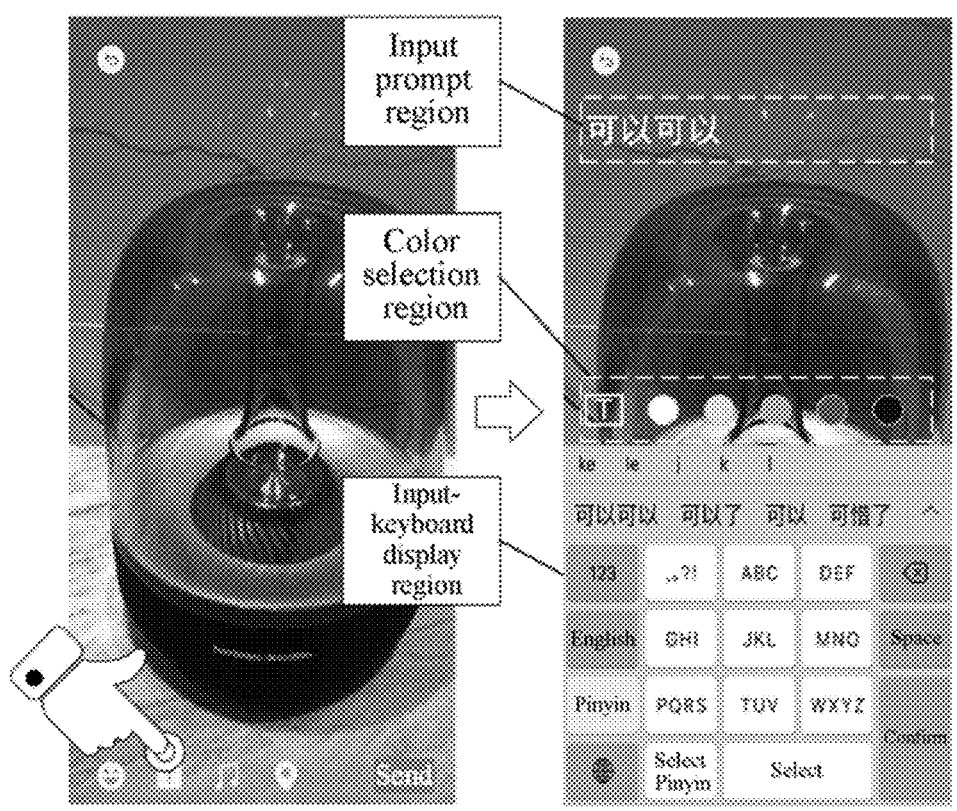
FIG. 8 is a schematic diagram of a text adding interface according to an embodiment of the present disclosure.

In an embodiment of the present disclosure, as shown in FIG. 8, after the user operates the icon of adding text to a personal status video, a display screen including an input-keyboard display region, a color selection region, and an input prompt region may be displayed for the user. The user may input text in the input-keyboard display region. The inputted text is prompted in the input prompt region, so that the user can learn the inputted text. The color selection region provides various colors for the user to select. The user can make a selection according to the preference of the user. Similarly, after selecting the text, the user may drag the text, and adjust the text to a desired position, and scale the text to a desired size.

Figure 9:
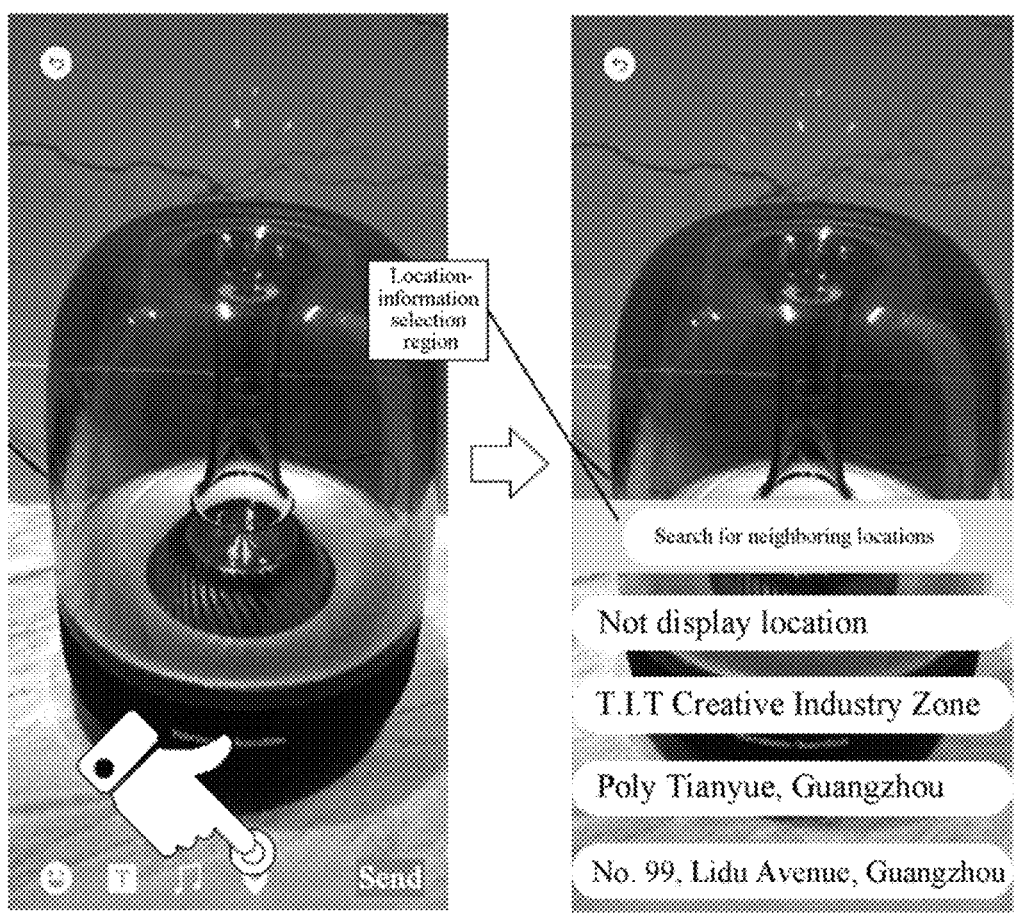
FIG. 9 is a schematic diagram of a location adding interface according to an embodiment of the present disclosure.
Figure 10:
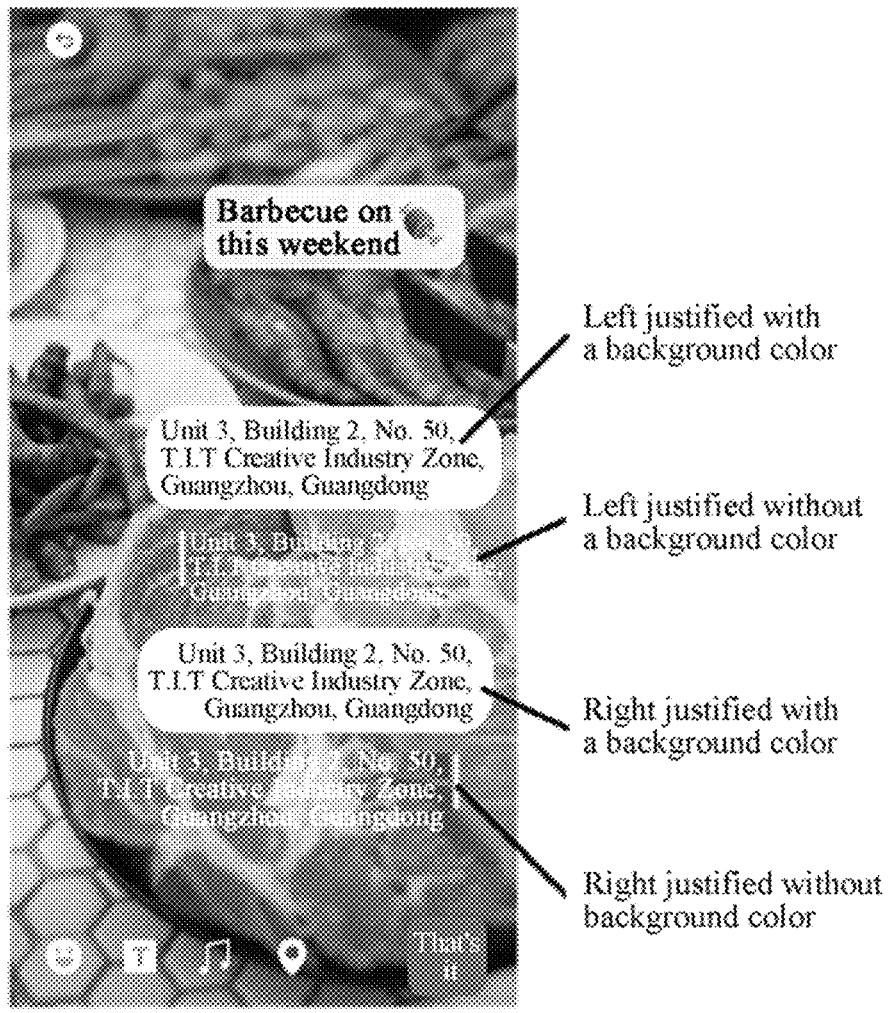
FIG. 10 is a schematic diagram of a display style of location information according to an embodiment of the present disclosure.

In an embodiment of the present disclosure, as shown in FIG. 9, after the user operates the icon of adding geographical location information to a personal status video, a display screen including a location-information selection region is displayed for the user. The user may select a location of the user or location information that the user wants to add in the location-information selection region. After the user selects the location information, a display style of the location information can be further selected. As shown in FIG. 10, the display style of the location information may include a left-justified display style or a right-justified display style, a background-color display style and a no-background-color display style, and certainly another display style, which is not limited in this embodiment of the present disclosure.

In one embodiment of the present disclosure, default location information provided in the location-information selection region may be some pieces of landmark location information around the current location of the user. When the location information is displayed, default geographical location information other than a city may be displayed, such as "Unit 3, Building 2, No. 50, T.I.T Creative Industry Zone" shown in FIG. 10. Besides the option of displaying specific location information, an option of not displaying location information may be further displayed, as shown in FIG. 9. In this way, when the user accesses a location-information adding interface through a possible mis-operation, or does not want to add location information after accessing the location-information adding interface, the user can select the option of not displaying location information, and exit the interface.

Figure 11:
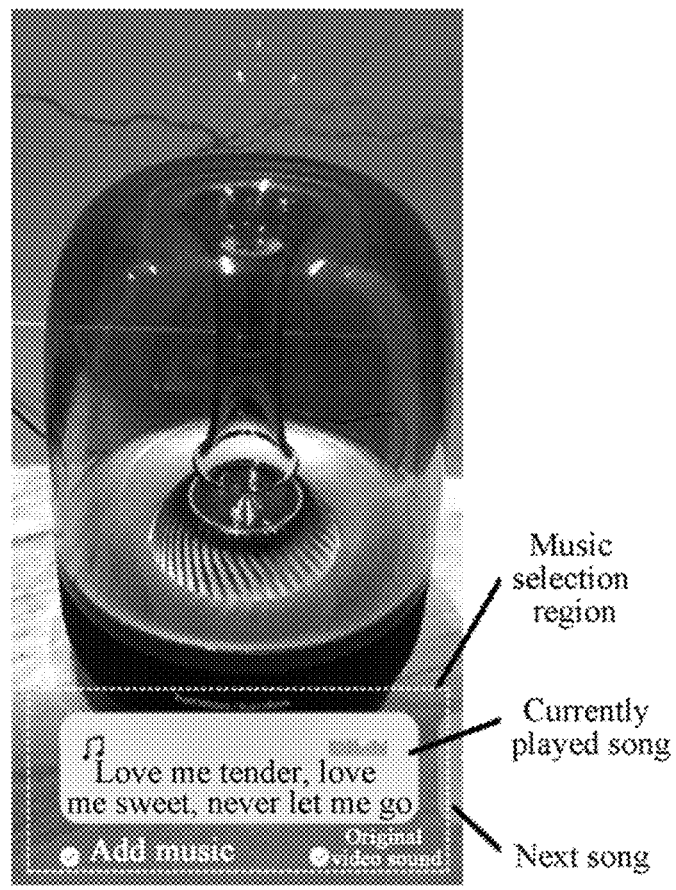
FIG. 11 is a schematic diagram of a music adding interface according to an embodiment of the present disclosure.

In an embodiment of the present disclosure, as shown in FIG. 11, after the user operates the icon of adding music to a personal status video, a display screen including a music selection region is displayed for the user. The user may select a piece of music that the user wants to add in the music selection region. A plurality of songs recommended for the user may be displayed in the music selection region. The user may select one song for trial listening and select a desired song according to a result of the trial listening. Alternatively, the user may upload, from the local, a song that has been downloaded for music adding. Alternatively, merely a currently played song may be displayed in the music selection region, the user can switch a song by sliding left and right, which is used as a specific example in FIG. 11.

In one embodiment of the present disclosure, during song recommendation for the user, recognition may be performed on the content of the personal status video of the user, to recommend a plurality of songs from a song library to the user according to the content of the personal status video in combination with a plurality of dimensions such as preferences of the user, top hits, and random recommendation. For example, 10 songs are recommended for each video. During specific implementation, music data shared by the user on the social platform may be further referred to. A plurality of songs are recommended to the user from music data shared by the user. The music data shared by the user can reflect the preferences of the user in songs. Therefore, songs recommended to the user based on the music data shared by the user are more likely to be favored by the user. The music data shared by the user may include a song, text related to a song, and the like that are shared by the user on the social platform.

In one embodiment of the present disclosure, when songs recommended to the user are displayed, titles of the songs may be displayed for the user, and the songs are played for the user to make a selection according to trial listening. Alternatively, because in most cases, titles of songs cannot well help the user to select a song, and the user usually focuses more on lyrics and the melody of a song when adding music, when a recommended song is displayed for the user, lyrics of the song may be further displayed, to better help the user to select a song for music adding. Certainly, in an actual application, if the lyrics are displayed for the user, the title of the song may be displayed or may not be displayed, which is not limited in this embodiment of the present disclosure.

In one embodiment of the present disclosure, on a music-adding display interface, in addition to the music selection region, other functional buttons may be further displayed, for example, a "Add music" button and an "Original video sound" button shown in FIG. 11. If the user selects a song, and operates the "Add music" button, the user can add music to the personal status video. If the user operates the "Original video sound" button, the original video sound can be retained and no song is added to the personal status video.

Step 203: Upload the personal status video to a back-end server, and display indication information of the personal status video in a personal-information display region of the personal homepage.

In one embodiment of the present disclosure, after completing editing of the personal status video, the user may publish the edited personal status video. As shown in FIG. 10, a display interface of the edited personal status video may include a "That's it" button. If the user operates the button, the personal status video can be updated to the back-end server. After the uploading is completed, the back-end server feeds back feedback information indicating a successful upload to the user equipment. After receiving the feedback information, the user equipment displays the feedback information to the user. For example, words, such as "Successfully published", is displayed on a display unit.

Specifically, when the user successfully publishes the video, the personal homepage of the user may be updated correspondingly. For example, the indication information of the published personal status video may be displayed in the personal-information display region of the personal homepage. The indication information may be a thumbnail of the personal status video, or a partial image of the personal status video. The thumbnail may be one frame of the personal status video, for example, the first frame of the personal status video, or a frame selected by the user. During specific display, entire content of the frame may be displayed, or partial content of the frame may be displayed. The partial image of the personal status video refers to a partial image that can be displayed in the personal-information display region. That is, in the personal homepage, the indication information of the personal status video may indicate by playing the personal status video. During playback, for each frame of the personal status video, a part of the frame image may be displayed, for example an upper half part, a lower half part, or any part in the middle.

Figure 12A:
FIG. 12A and FIG. 12B are schematic diagrams of video playback according to an embodiment of the present disclosure.
Figure 12B:
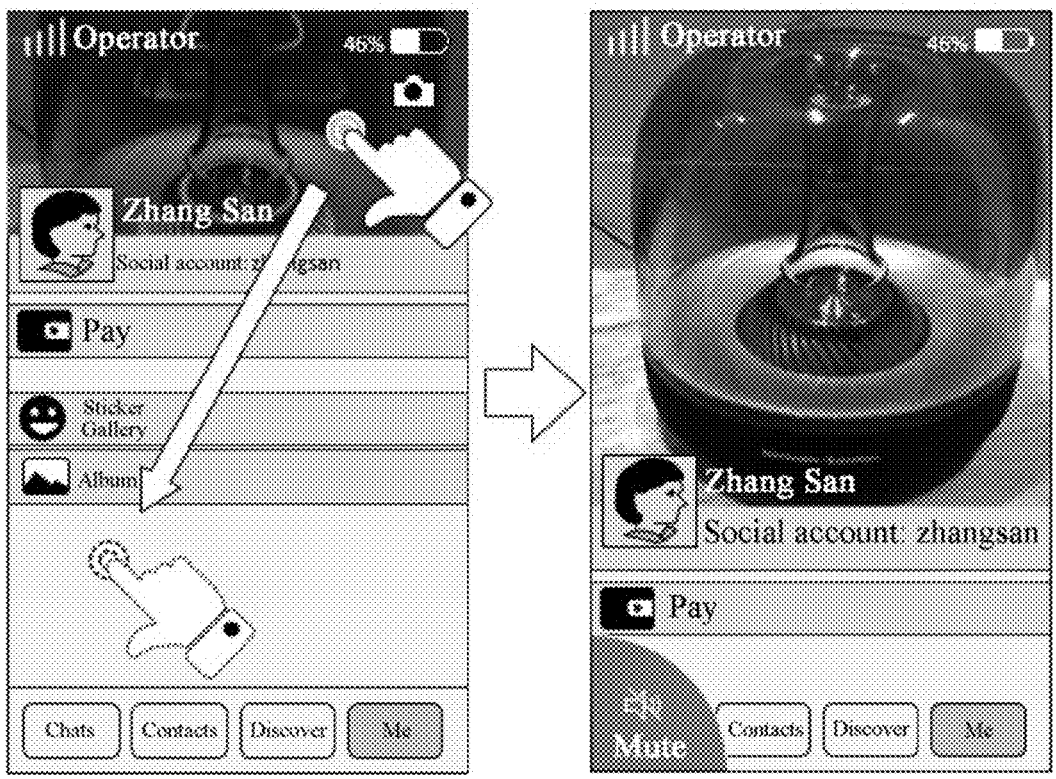

Specifically, the indication information of the published personal status video is displayed in the personal-information display region of the personal homepage. The indication information of the personal status video may be displayed as a cover of the personal-information display region, or may be displayed as a background of the personal-information display region. In an embodiment of the present disclosure, when the indication information is displayed as the background, the indication information may be used as a background of the entire personal-information display region or a background of partial content in the personal-information display region. For example, the indication information of the personal status video may be displayed in a background region corresponding to an avatar icon, or may be displayed as a background of other content in the personal-information display region, for example, be displayed in a background region corresponding to the title bar above the avatar icon. As shown in FIG. 12A and FIG. 12B, the thumbnail of the personal status video is displayed as a background of an avatar icon, a nickname, and a title bar. The avatar icon, the nickname, and the title bar are displayed above the thumbnail of the personal status video.

During specific implementation, the user may publish a plurality of personal status videos. Only one of the personal status videos may be displayed on the personal homepage. For example, the video may be a latest published personal status video, or a personal status video the user selects to top. Alternatively, the plurality of personal status videos may be displayed on the personal homepage together in a form of a list, or may be displayed on the personal homepage in a form of a nine-square grid, or certainly may be displayed in another possible display form, which is not limited in this embodiment of the present disclosure.

In one embodiment of the present disclosure, after publishing the personal status video, the user can further browse the personal status video published by the user.

Specifically, the user may perform an operation for playing the personal status video on the personal homepage. The user equipment detects an operation indication corresponding to the operation of the user, that is a play back indication for playing the personal status video, and sends a video playback request to the back-end server. The video playback request may carry the personal status video of which play back is requested and play back information. After the back-end server returns video stream data of the personal status video to the user equipment, the user equipment may call a video playback control to play the personal status video.

The operation for playing the personal status video may be an operation of tapping/clicking the thumbnail displayed on the personal homepage, or the operation for playing the personal status video may be a preset gesture operation. Different gesture operations may correspond to different pieces of play back information. As shown in FIG. 12A, sliding down the personal homepage may correspond to an operation for playing the personal status video normally. As shown in FIG. 12B, sliding left the personal homepage may correspond to an operation of playing the personal status video in mute, and then the operation indication detected by the user equipment is a mute playback indication. In this way, the user can control the video conveniently and rapidly. When the video is played in mute, a mute playback mark may be displayed on a play back interface to prompt the user. Certainly, other gesture operations may be defined for playing the personal status video, or the user may set gesture operations needed by the user, for playing the personal status video.

In one embodiment of the present disclosure, when at least one social contact of the user updates a personal status video, and the back-end server sends an indication message used for indicating that the personal status video is updated on a personal homepage of the at least one social contact, the user equipment may display a video mark in a personal-information display region of the at least one social contact according to the indication message, the video mark being used for indicating that a corresponding social contact has a personal status video.

Figure 13:
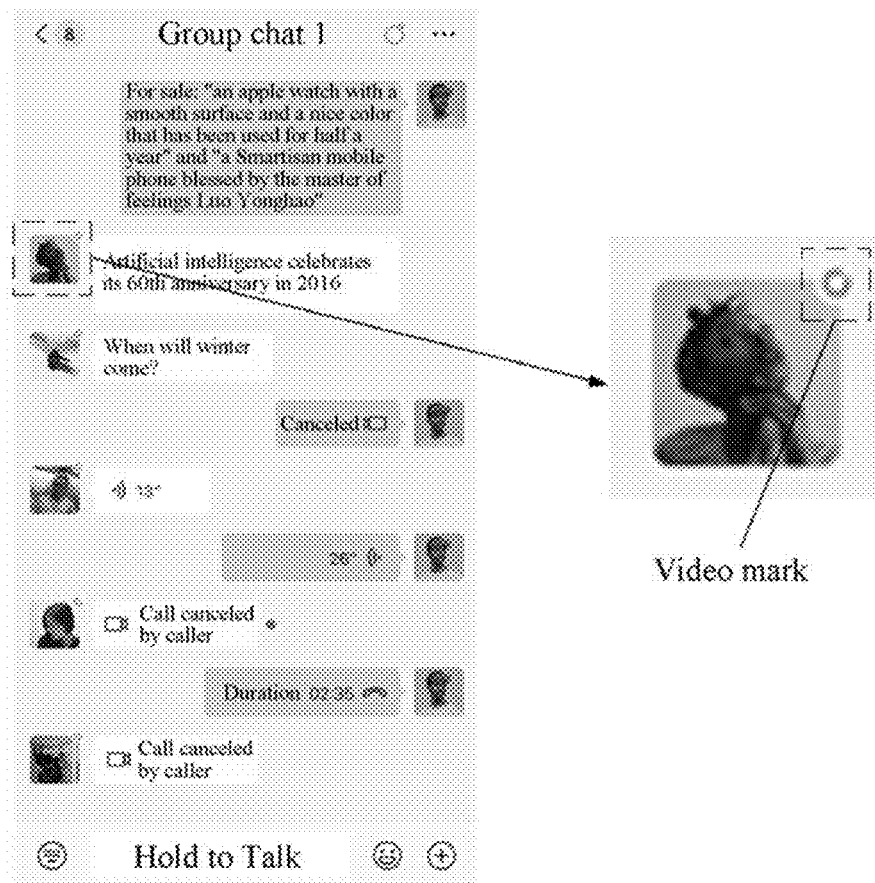
FIG. 13 is a schematic diagram of displaying a video mark in a personal-information display region according to an embodiment of the present disclosure.

For example, after a first user publishes a personal status video, to prompt a second user different from the first user, a video mark may be displayed in a display interface of the second user and in a personal-information display region of the first user. The video mark is used for indicating that the first user has a personal status video. In one example, the display interface of the second user may be a dialog interface presenting chats between multiple users that include at least the second user and the first user. A chatting page (e.g., a group chat dialog interface) shown in FIG. 13 includes personal-information display regions (e.g., icons/avatars) of a plurality of social contacts. Using an avatar shown in FIG. 13 as an example, a video mark may be displayed at a specific position of the avatar. When there is a video mark in an avatar, it indicates that a social contact corresponding to the avatar has a personal status video.

In specific implementation, video marks with different styles or video marks in different colors are used for indicating whether a personal status video of a social contact has been viewed. For example, if the video mark is in a first style, it indicates that there is a personal status video that is not viewed. If the video mark is in a second style, it indicates that there are personal status videos and all the personal status videos have been viewed. In addition, a quantity of video marks can be used for indicating a quantity of personal status videos. For example, as there are a quantity of personal status videos, the same quantity of the video marks are displayed. Certainly, for conciseness of a display interface, regardless of how many personal status videos exist, only one video mark is displayed.

In one embodiment of the present disclosure, when a user wants to browse a personal status video of a specific social contact, the user may access a corresponding personal homepage of the social contact, and further browse the personal status video of the social contact. The manner of browsing the personal status video on the personal homepage is same as the manner in embodiments shown in FIG. 12A and FIG. 12B. Therefore, reference may be made to the embodiments shown in FIG. 12A and FIG. 12B for the manner of browsing the personal status video on the personal homepage of the social contact. Details are not described herein again.

Figure 14:
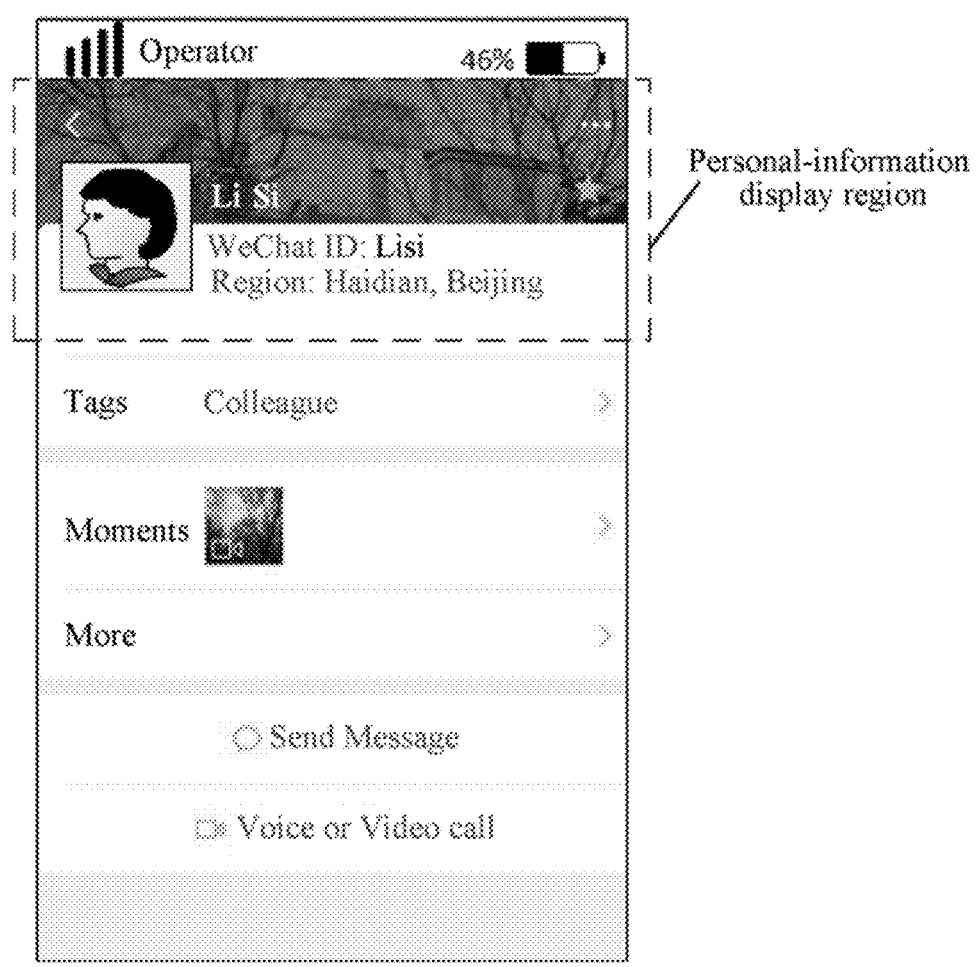
FIG. 14 is a schematic diagram of display of a personal homepage of a social contact according to an embodiment of the present disclosure.

The user may perform an operation on a page including a personal-information display region of the social contact, for example, tap/click an avatar in the personal-information display region, so that the user equipment can detect an operation indication of the user, and can determine that the operation indication is used for jumping to the corresponding personal homepage of the social contact. In response, the user equipment accesses the personal homepage of the social contact. FIG. 14 is a schematic display diagram of a personal homepage of a social contact, including a personal-information display region of the social contact and information such as tags of the social contact. Indication information of a personal status video of the social contact is displayed in the personal-information display region.

In one embodiment of the present disclosure, the page including the personal-information display region of the social contact may be a chatting page, a Contacts page, a historical message list page, and a page corresponding to a centralized push portal, or certainly may include any other page including a personal-information display region of a social contact, which is not limited in this embodiment of the present disclosure.

In one embodiment of the present disclosure, to enable the user to browse more quickly, a quicker browsing manner may be further be provided for the user. For example, if the user double-clicks an avatar icon, a personal status video of a social contact corresponding to the avatar icon can be directly played, or certainly there may be another possible operation, which is not limited in this embodiment of the present disclosure. The double-click is an operation of receiving the second click operation within preset duration after receiving the first click operation.

Specifically, using an example in which the user double-clicks an avatar icon to play a personal status video of a social contact, after the user double-clicks the avatar icon, the user equipment can detect an operation indication inputted by the user, and when it is determined that the operation indication is a browsing indication used for browsing a personal status video of a selected social contact, the user equipment sends a video browsing request to the back-end server. After the back-end server returns a video browsing response to the user equipment, the user equipment can determine, according to the video browsing response, whether the selected social contact has a personal status video. If it is determined that the selected social contact has a personal status video, a video playback control is called for playing the personal status video of the selected social contact. Otherwise, prompt information for prompting that the selected social contact has no personal status video is outputted. For example, the prompt information may be outputted in a form of text or in an avatar-shaking manner. An action of shaking the head is simulated to indicate that the selected social contact has no personal status video.

In one embodiment of the present disclosure, to further improve the privacy of information publishing of a user, a personal status video may be a feature of only existing in preset duration. That is, when publication duration of the personal status video exceeds the preset duration, the personal status video cannot be browsed by a social contact on a social platform. Correspondingly, when a user views a personal homepage of a social contact, merely a personal status video of which publication duration does not exceed the preset duration can be browsed. For personal status videos, of which publication duration exceeds the preset duration, of the user, the videos may be deleted on the back-end server, or to facilitate subsequent viewing by the user, attributes of the personal status videos may be set to be visible only to the user.

Specifically, the back-end server may monitor publication duration of a personal status video, and when detecting that the publication duration of the personal status video exceeds the preset duration, the back-end server sends an indication message used for indicating that publication duration of a personal status video of at least one social contact exceeds the preset duration to the user equipment. The user equipment may update a video mark in a personal-information display region of the at least one social contact based on the indication message.

The preset duration may be set by default in an APP, for example, may be 24 hours, or may be set by the user.

For example, if the first user publishes two personal status videos, that is, a first video and a second video. When detecting that publication duration of the first video exceeds the preset duration, the back-end server pushes an indication message to a social contact of the first user. Using the second user as an example, if user equipment corresponding to the second user determines, according to the indication message, that currently the first user still has a personal status video of which publication duration does not exceed the preset duration, a video mark is still displayed in the personal-information display region of the first user. When detecting that publication duration of the second video also exceeds the preset duration, the back-end server also pushes an indication message to the second user. If the user equipment corresponding to the second user determines, according to the indication message, that currently the first user does not have a personal status video that expires, display of a video mark in the personal-information display region of the first user is canceled.

Based on the above, in one embodiment of the present disclosure, when a shooting indication for shooting a personal status video is detected, the personal status video is obtained and uploaded to a back-end server, and indication information of the personal status video is displayed on a personal homepage. In this way, the personal status video published by the user is published on the personal homepage. The personal homepage is different from the current centralized push portal of the social platform, and only a personal status video is displayed on the personal homepage, so that the user can relaxedly publish a personal status video on the personal homepage of the user without interfering with social contacts, and the privacy of information publishing is improved. Correspondingly, if another person wants to browse the personal status video of the publisher, the person needs to actively access the personal homepage of the publisher for browsing. Therefore, it is unnecessary for the publisher to overly consider social relationships and concern interference with others when publishing a video. Therefore, the pressure of video publishing is reduced, thereby providing better social experience for the user.

In the embodiments of the present disclosure, duration during which the personal status video is provided for the social contacts to browse may further be limited. When preset duration is reached, the personal status video of the publisher is hidden from the social contacts, so that the social contacts cannot browse the personal status video of the publisher any longer. In this way, the personal status video is a personal space of the publisher, the user can express and define oneself as much as possible without overly taking a social relationship into consideration. Therefore, because the video is hidden from the social contacts after the preset duration, the publisher can share life and moods through the personal status video when shooting the video without worry about that a published video expressing a relatively hysterical mood may exert a bad impression on a subsequently added social contact, thereby further reducing the psychological pressure of the publisher and improving the privacy of information publishing.

Figure 15:
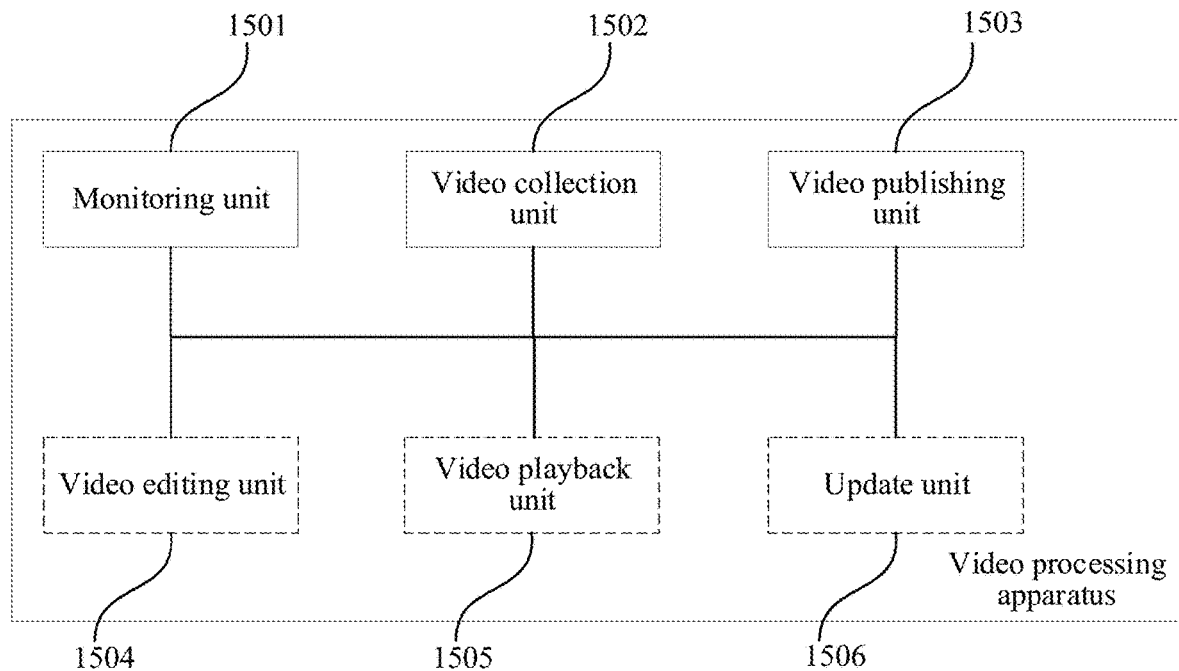
FIG. 15 is a schematic structural diagram of a video processing apparatus according to an embodiment of the present disclosure.

Referring to FIG. 15, based on the same inventive concept, the embodiments of the present disclosure further provide a video processing apparatus. The apparatus may include:

a monitoring unit 1501, configured to monitor an operation indication inputted by a user through a personal homepage on a social platform, the personal homepage being used for displaying personal information of the user:

a video acquisition unit 1502, configured to obtain, when the operation indication is a shooting indication for shooting a personal status video, the personal status video;

a video publishing unit 1503, configured to upload the personal status video to a back-end server of the social platform: and display indication information of the personal status video in a personal-information display region of the personal homepage.

In one embodiment of the present disclosure, the video acquisition unit 1502 is specifically configured to:

call a video acquisition control to collect the personal status video; and obtain the personal status video shot by the video acquisition control.

In one embodiment of the present disclosure, the video acquisition unit 1502 is specifically configured to:

display a video-collecting-manner selection interface;

receive a video-collecting-manner determining indication inputted through the video-collecting-manner selection interface: and call the video acquisition control corresponding to the video-collecting-manner determining indication to collect the personal status video.

In an embodiment of the present disclosure, the video acquisition control includes:

a local video shooting control: or a local video uploading control: or a control for uploading pictures in a local album to edit a personal status video: or a control for obtaining a published video from a social platform.

In an embodiment of the present disclosure, the apparatus further includes a video editing unit 1504, configured to:

display a personal-status-video editing interface before the personal status video is uploaded to the back-end server of the social platform; and call a video editing control to edit the personal status video according to an editing operation indication inputted through the personal-status-video editing interface.

In one embodiment of the present disclosure, the video editing unit 1504 is specifically configured to:

call the video editing control to add music to the personal status video;

call the video editing control to add text to the personal status video;

call the video editing control to add a picture to the personal status video; and call the video editing control to add geographical location information to the personal status video.

In an embodiment of the present disclosure, the indication information is a thumbnail of the personal status video, or a partial image of the personal status video; and the shooting indication is inputted through a shooting icon displayed in the personal-information display region of the personal homepage.

In an embodiment of the present disclosure, the apparatus further includes a video playback unit 1505, configured to:

transmit a video playback request to the back-end server when the first operation indication is a playback indication for playing the personal status video;

call a video playback control to play the personal status video based on video stream data of the personal status video returned by the back-end server.

In one embodiment of the present disclosure, the video playback unit 1505 is specifically configured to:

play in mute the personal status video when the playback indication is a mute play back indication.

In an embodiment of the present disclosure, the monitoring unit 1501 is further configured to monitor a second operation indication inputted through a page including a personal-information display region of a selected social contact: transmit a video browsing request to the back-end server when the second operation indication is a browsing indication used for browsing a personal status video of the selected social contact: determine, based on a video browsing response returned by the back-end server, whether the selected social contact has a personal status video; and calling, when the selected social contact has a personal status video, the video playback control to play the personal status video of the selected social contact: otherwise, outputting prompt information used for prompting that the selected social contact does not have a personal status video.

In an embodiment of the present disclosure, the monitoring unit 1501 is further configured to display, in response to receiving an indication message transmitted by the back-end server and used for indicating that a personal status video is updated on a personal homepage of at least one social contact, a video mark in a personal-information display region of the at least one social contact, the video mark being used for indicating that a corresponding social contact has a personal status video.

In an embodiment of the present disclosure, the apparatus further includes an update unit 1506, configured to:

update the video mark in the personal-information display region of the at least one social contact in response to receiving an indication message transmitted by the back-end server and used for indicating that publication duration of the personal status video of the at least one social contact is greater than or equal to preset duration, the personal status video of the at least one social contact being invisible to the user after the publication duration is greater than or equal to the preset duration.

The apparatus may be configured to perform the method that can be performed by devices or apparatuses in the embodiments shown from FIG. 2 to FIG. 14. Therefore, reference may be made to description of the embodiments shown in FIG. 2 to FIG. 14 for functions that the functional modules of the apparatus can implement. Details are not described herein again. Although the video editing unit 1504, the video playback unit 1505, and the update unit 1506 are not shown in FIG. 15, it needs to be understood that the units are not required functional units. Therefore, the units are shown by using dashed lines in FIG. 15.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 16:
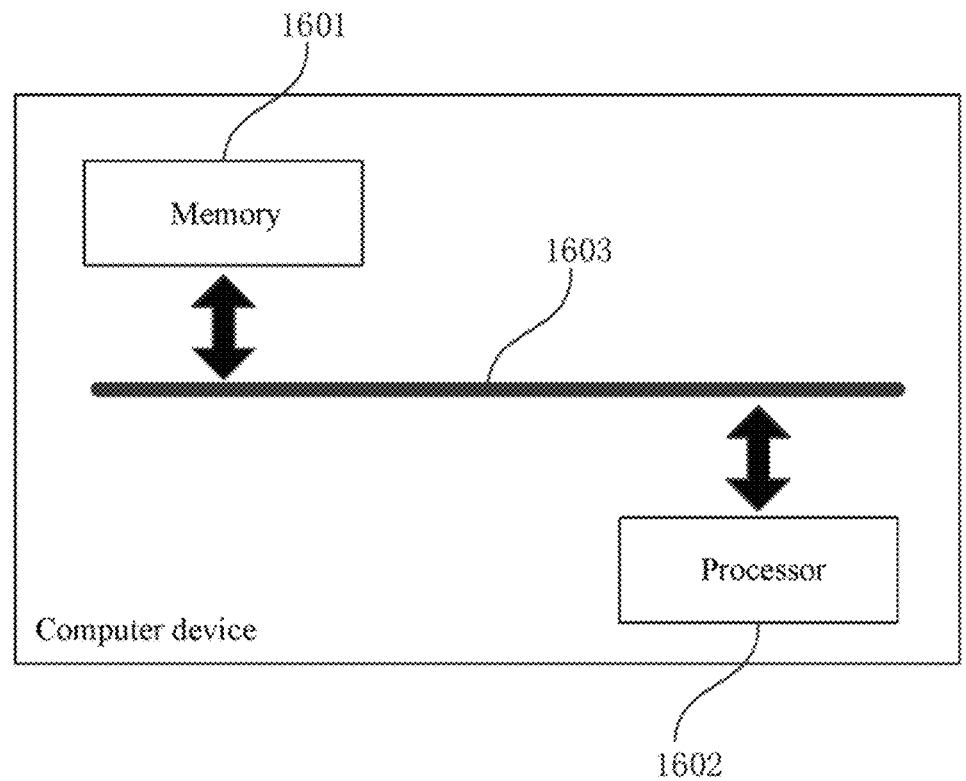
FIG. 16 is a schematic structural diagram of a computer device according to an embodiment of the present disclosure.

Referring to FIG. 16, based on the same technical concept, an embodiment of the present disclosure further provides a computer device. The computer device may include a memory 1601 and a processor 1602.

The memory 1601 is configured to store a computer program executed by the processor 1602. The memory 1601 may mainly include a program storage area and a data storage area. The program storage area may store an operating system, an application program required by at least one function, or the like. The data storage area may store data created according to use of the computer device. The processor 1602 may be a central processing unit (CPU), a digital processing unit, or the like. In one embodiment of the present disclosure, a specific connection medium between the memory 1601 and the processor 1602 is not limited. In one embodiment of the present disclosure, in FIG. 16, the memory 1601 and the processor 1602 are connected to each other through a bus 1603. The bus 1603 is represented by using a bold line in FIG. 16. A manner of connection between other components is only schematically described, but is not used as a limitation. The bus 1603 may be classified into an address bus, a data bus, a control bus, or the like. For ease of representation, only one thick line is used to represent the bus in FIG. 16, but this does not mean that there is only one bus or only one type of bus.

The memory 1601 may be a volatile memory such as a random-access memory (RAM). Alternatively, the memory 1601 may be a non-volatile memory, such as a read-only memory, a flash memory, a hard disk drive (HDD), or a solid-state drive (SSD). Alternatively, the memory 1601 is any other medium that can be used to carry or store expected program code having an instruction or data structure form and that can be accessed by a computer, but is not limited thereto. The memory 1601 may be a combination of the foregoing memories.

The processor 1602 is configured to invoke a computer program stored in the memory 1601 to perform the method performed by the devices in the embodiments shown from FIG. 2 to FIG. 14.

In some possible implementations, each aspect of the method provided in the present disclosure may be further implemented in a form of a program product including program code. When the program product is run on a computer device, the program code is used to enable the computer device to perform steps of the method according to the various exemplary implementations of the present disclosure described above in the specification. For example, the computer device can perform the method performed by the devices in the embodiments shown from FIG. 2 to FIG. 14.

The program product may use any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples (a non-exhaustive list) of the readable storage medium include an electrical connection having one or more wires, a portable disk, a hard disk, a RAM, a ROM, an erasable programmable read-only memory (EPROM or flash memory), an optical fiber, a portable compact disk read-only memory (CD-ROM), an optical storage medium, a magnetic storage medium, or any appropriate combination thereof.

The program product of the method according to an implementation of the present disclosure may use a CD-ROM, include program code, and may be run on the computing device. However, the program product of the present disclosure is not limited to this. In this specification, the readable storage medium may be any tangible medium including or storing a program, and the program may be used by or in combination with an instruction execution system, apparatus, or device.

The readable signal medium may include a data signal propagated in a baseband or as part of a carrier, and stores computer-readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program configured to be used by or in combination with an instruction execution system, apparatus, or device.

The program code included in the readable medium may be transmitted by using any appropriate medium, including but not limited to: a wireless medium, a wire, an optical cable, RF, any suitable combination thereof, or the like.

The program code used for executing the operations of the present disclosure may be written by using one or more programming languages or a combination thereof. The programming languages include an object-oriented programming language such as Java, C++ and the like, and a procedural programming language such as "C" or similar programming languages. The program code may be completely executed on a user computing device, partially executed on user equipment, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

Although several units or subunits of the apparatus are mentioned in detailed description above, such division is merely an example but not mandatory. In fact, according to the implementations of the present disclosure, features and functions of two or more units described above may be specified in one unit. On the contrary, the features or functions of one unit described above may further be divided and specified by a plurality of units.

In addition, although the operations of the method in the embodiments of the present disclosure are described in a specific order in the accompanying drawings. This does not require or imply that the operations have to be performed in the specific order, or all the operations shown have to be performed to achieve an expected result. Additionally, or alternatively, some operations may be omitted, and a plurality of operations are combined into one operation to be performed, and/or one operation is divided into a plurality of operations to be performed.

A person skilled in the art is to understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to flowcharts and/or block diagrams of the method, the device (system), and the computer program product according to the embodiments of the present disclosure. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specified manner, so that the instructions stored in the computer readable memory generate a product including an instruction apparatus, where the instruction apparatus implements functions specified in one or more procedures in the flowcharts and/or one or more blocks in the block diagrams.

The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the exemplary embodiments of the present disclosure have been described, once persons skilled in the art learn a basic creative concept, they can make other changes and modifications to these embodiments. Therefore, the following claims are intended to cover the exemplary embodiments and all changes and modifications falling within the scope of the present disclosure.

Certainly, a person skilled in the art can make various modifications and variations to the present disclosure without departing from the spirit and scope of the present disclosure. In this case, if the modifications and variations made to the present disclosure fall within the scope of the claims of the present disclosure and their equivalent technologies, the present disclosure is intended to include these modifications and variations.

What is claimed is:

1. A video processing method, performed by a computer device, the method comprising:

monitoring a first operation indication inputted by a user through a personal homepage on a social platform, the personal homepage being used for displaying personal information of the user;

obtaining, when the first operation indication is a shooting indication for shooting a personal status video, the personal status video;

uploading the personal status video to a back-end server of the social platform;

displaying indication information of the personal status video in a personal-information display region of the personal homepage; and displaying a chatting page with one or more social contacts of the user and displaying a video mark at an avatar of a first social contact of the one or more social contacts, wherein the video mark indicates that the first social contact has a status video.

2. The method according to claim 1, wherein the obtaining the personal status video comprises:

calling a video acquisition control to collect the personal status video; and obtaining the personal status video through the video acquisition control.

3. The method according to claim 2, wherein the calling a video acquisition control to collect the personal status video comprises:

displaying a video-collecting-manner selection interface;

receiving a video-collecting-manner determining indication inputted through the video-collecting-manner selection interface; and calling the video acquisition control corresponding to the video-collecting-manner determining indication to collect the personal status video.

4. The method according to claim 3, wherein the video acquisition control comprises:

a local video shooting control; or a local video uploading control; or a control for uploading pictures in a local album to edit the personal status video; or a control for obtaining a published video from a social platform.

5. The method according to claim 1, wherein before the uploading the personal status video to a back-end server of the social platform, the method further comprises:

displaying a personal-status-video editing interface; and calling a video editing control to edit the personal status video according to an editing operation indication inputted through the personal-status-video editing interface.

6. The method according to claim 5, wherein the calling a video editing control to edit the personal status video comprises at least one of:

calling the video editing control to add music to the personal status video;

calling the video editing control to add text to the personal status video;

calling the video editing control to add a picture to the personal status video; and calling the video editing control to add geographical location information to the personal status video.

7. The method according to claim 1, wherein:

the indication information of the personal status video is a thumbnail of the personal status video, or a partial image of the personal status video; and the shooting indication is inputted through a shooting icon displayed in the personal-information display region of the personal homepage.

8. The method according to claim 7, wherein after the monitoring a first operation indication inputted by a user through a personal homepage on a social platform, the method further comprises:
 transmitting a video playback request to the back-end server when the first operation indication is a playback indication for playing the personal status video;
 calling a video playback control to play the personal status video based on video stream data of the personal status video returned by the back-end server.

9. The method according to claim 8, wherein the calling a video playback control to play the personal status video comprises:
 playing in mute the personal status video when the playback indication is a mute playback indication.

10. The method according to claim 1, further comprising:
 monitoring a second operation indication inputted through a page comprising a personal-information display region of a selected social contact;
 transmitting a video browsing request to the back-end server when the second operation indication is a browsing indication used for browsing a status video of the selected social contact;
 determining, based on a video browsing response returned by the back-end server, whether the selected social contact has a status video;
 calling, when the selected social contact has a status video, the video playback control to play the status video of the selected social contact; when the selected social contact does not have a status video, outputting prompt information used for prompting that the selected social contact does not have a status video.

11. The method according to claim 1, further comprising:
 displaying, in response to receiving an indication message transmitted by the back-end server indicating that a status video is updated on a personal homepage of at least one social contact, a video mark in a personal-information display region of the at least one social contact, the video mark being used for indicating that a corresponding social contact has a status video.

12. The method according to claim 11, further comprising:
 updating the video mark in the personal-information display region of the at least one social contact in response to receiving an indication message transmitted by the back-end server indicating that a publication duration of the status video of the at least one social contact is greater than or equal to preset duration, the status video of the at least one social contact being invisible to the user after the publication duration is greater than or equal to the preset duration.

13. The method according to claim 1, further comprising:
 displaying the video mark in a first style in response to that the status video is not viewed by the user, and
 displaying the video mark in a second style in response to the status video being viewed.

14. The method according to claim 1, wherein the status video is not presented on a page that displays updates of social contacts of the user.

15. A computer device, comprising:
 at least one processor; and
 a memory communicatively connected to the at least one processor,
 the memory storing instructions executable by the at least one processor, the instructions being executed by the at least one processor, to cause the at least one processor to perform a plurality of operations comprising:
  monitoring a first operation indication inputted by a user through a personal homepage on a social platform, the personal homepage being used for displaying personal information of the user;
  obtaining, when the first operation indication is a shooting indication for shooting a personal status video, the personal status video;
  uploading the personal status video to a back-end server of the social platform;
  displaying indication information of the personal status video in a personal-information display region of the personal homepage; and
  displaying a chatting page with one or more social contacts of the user and displaying a video mark at an avatar of a first social contact of the one or more social contacts, wherein the video mark indicates that the first social contact has a status video.

16. The device according to claim 15, wherein the obtaining the personal status video comprises:
 calling a video acquisition control to collect the personal status video; and
 obtaining the personal status video through the video acquisition control.

17. The device according to claim 16, wherein the calling a video acquisition control to collect the personal status video comprises:
 displaying a video-collecting-manner selection interface;
 receiving a video-collecting-manner determining indication inputted through the video-collecting-manner selection interface; and
 calling the video acquisition control corresponding to the video-collecting-manner determining indication to collect the personal status video.

18. The device according to claim 15, wherein before the uploading the personal status video to a back-end server of the social platform, the plurality of operations further comprises:
 displaying a personal-status-video editing interface; and
 calling a video editing control to edit the personal status video according to an editing operation indication inputted through the personal-status-video editing interface.

19. The device according to claim 18, wherein the calling a video editing control to edit the personal status video comprises at least one of:
 calling the video editing control to add music to the personal status video;
 calling the video editing control to add text to the personal status video;
 calling the video editing control to add a picture to the personal status video; and
 calling the video editing control to add geographical location information to the personal status video.

20. A non-transitory computer storage medium, comprising computer instructions, the computer instructions, when run on a computer device, causing the computer device to perform a plurality of operations comprising:
 monitoring a first operation indication inputted by a user through a personal homepage on a social platform, the personal homepage being used for displaying personal information of the user;
 obtaining, when the first operation indication is a shooting indication for shooting a personal status video, the personal status video;
 uploading the personal status video to a back-end server of the social platform;

displaying indication information of the personal status video in a personal-information display region of the personal homepage; and displaying a chatting page with one or more social contacts of the user and displaying a video mark at an avatar of a first social contact of the one or more social contacts, wherein the video mark indicates that the first social contact has a status video.

* * * * *